United States Patent [19]

Sweeney

[11] 4,347,512
[45] Aug. 31, 1982

[54] COMMUNICATIONS SYSTEMS UTILIZING A RETRODIRECTIVE ANTENNA HAVING CONTROLLABLE REFLECTIVITY CHARACTERISTICS

[75] Inventor: Edmund F. Sweeney, Laurel, Md.

[73] Assignee: Allied Corporation, Morris Township, Morris County, N.J.

[21] Appl. No.: 723,348

[22] Filed: Apr. 18, 1968

[51] Int. Cl.³ .................. G01S 13/74; H01Q 19/08
[52] U.S. Cl. ................. 343/6.5 R; 343/18 D; 343/100 ET; 343/753; 343/911 L
[58] Field of Search ............... 343/6.5, 6.5 SS, 6.8, 343/18 B, 18 D, 100.11, 753, 756, 911 L, 6.5 R, 100 ET

[56] References Cited
U.S. PATENT DOCUMENTS

| 2,159,937 | 5/1939 | Zworykin | 343/100.11 |
| 2,921,305 | 1/1960 | Cole et al. | 343/753 X |
| 3,178,705 | 4/1965 | Clock et al. | 343/6.8 |
| 3,371,345 | 2/1968 | Lewis | 343/6.8 X |

OTHER PUBLICATIONS

"Spherical Radar Reflectors with High-Gain Omnidirectional Response", by H. E. Schrank, Westinghouse Air Arm Division, Balt. Md., Technical paper presented at the Sixth Annual East Coast Conference on Aeronautical and Navigational Electronics, Oct. 26–28, 1959, p. 11, 5–1.

Primary Examiner—Malcolm F. Hubler

[57] ABSTRACT

A communications system is described which utilizes an antenna having means for selectively controlling the amount of incident electromagnetic energy directionally reflected therefrom. The antenna is comprised of a spherically configured array of conductors which focus incident energy on a reflector whose electrical conductivity characteristics and thus reflectivity characteristics can be controllably varied. The reflector can comprise a gas tube whose conductivity and thus reflectivity characteristics are a function of the number of ionized gas molecules therein. Modulation of the reflector reflectivity characteristics permits identification information, for example, to be impressed on the energy reflected therefrom.

5 Claims, 6 Drawing Figures

COMMUNICATIONS SYSTEMS UTILIZING A RETRODIRECTIVE ANTENNA HAVING CONTROLLABLE REFLECTIVITY CHARACTERISTICS

The invention herein described was made in the course of or under a contract or subcontract thereunder, with United States Army Electronics Command.

BACKGROUND OF THE INVENTION

1. Field of the Invention

This invention relates generally to communication systems and more particularly to systems utilizing modulated reflected energy for communicating information. Although embodiments of the invention find utility in many diverse applications, they are particularly suited for use in light aircraft identification systems for facilitating the control of airport traffic.

2. Description of the Prior Art

Prior art systems are known which enable ground stations to interrogate and ascertain the identity of an aircraft. Such systems normally use both ground based and airborne transmitters and receivers. In operation, the ground based transmitter would transmit an interrogation signal which would be recognized by the airborne receiver and cause the airborne transmitter to transmit identification information back to the ground based receiver. Although such systems normally operate satisfactorily, they usually require somewhat heavy and expensive airborne equipment and thus are unsuitable for light aircraft. Moreover, since the airborne equipment normally utilizes many active components that may require considerable electrical power, its reliability is often less than desired. Furthermore, since the aircraft has no prior knowledge as to the direction from which the interrogation may come, it must necessarily reply in an omnidirectional pattern which makes the system vulnerable to spoofed replies from unidentifiable or unfriendly aircraft.

SUMMARY OF THE INVENTION

In accordance with the present invention, an antenna apparatus is provided suitable for use in an aircraft identification system, which apparatus functions to reflect energy incident thereon in a manner such that the reflected energy carries information and is highly concentrated in the direction of incidence.

More particularly, in accordance with the present invention, a retrodirective antenna is provided whose reflectivity characteristics are controlled to thus modulate the reflected energy. In a preferred embodiment of the invention, the antenna structure is comprised of a focussing means in the form of a spherically configured mesh of substantially parallel wires at 45 degrees to the horizontal. In this manner, the wires are arranged so as to focus energy incident on the spherical surface to a controllable reflector. The reflector preferably comprises a gas tube whose conductivity and thus reflectivity characteristics are a function of the number of ionized gas molecules therein. By properly controlling the ionization in the tube, information such as identification information, can be impressed on the reflected energy.

When the gas tube is not energized, the incident energy will be scattered omnidirectionally from the spherical surface. An amount will be reflected back to the energy source which amount is dependent upon the effective cross-sectional area of the sphere at the frequency of the energy. For example, if a given surface has an effective cross-sectional area $A_x$ at a given frequency, the amount of energy reflected back to the energy source is proportional to $A_x$. On the other hand, when the gas tube is energized, it enhances the amount of energy reflected back to the energy source. For example, the reflector, i.e. the gas tube, may define an effective cross-sectional area $A_y$ so that the energy reflected back to the source with the gas tube energized will be proportional to $A_x + A_y$.

In accordance with an important aspect of the present invention, the enhancement factor or effective cross-sectional area of the reflector can be made to vary between 0 and $A_y$ so that the energy reflected back to the source (e.g. ground station) can vary from $A_x$ to $A_x + A_y$. By varying the enhancement factor (i.e. effective cross-sectional area of the reflector) in accordance with some known coded format unique to that antenna, the source or ground station can identify the antenna and discriminate it from others in its vicinity.

DESCRIPTION OF THE DRAWINGS

The novel features of the invention are set forth with particularity in the appended claims. The invention will best be understood from the following description when read in conjunction with the accompanying drawings, in which:

Figure 1:
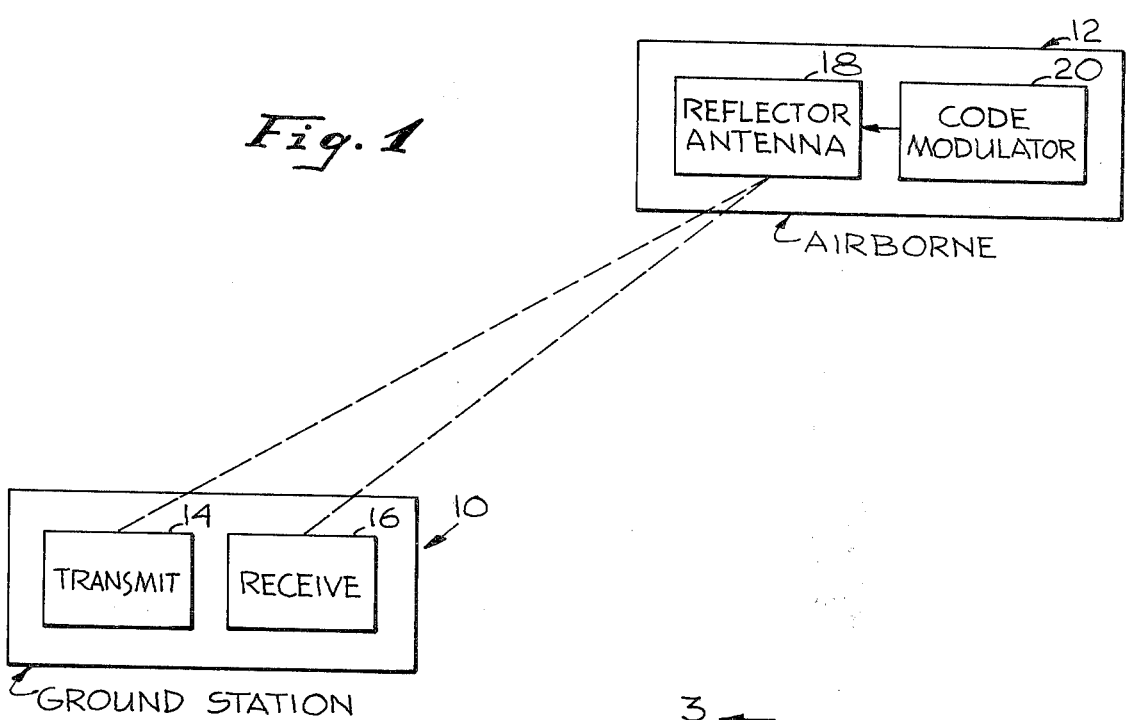
FIG. 1 is a block diagram of a communications system in accordance with the present invention.

Attention is now called to FIG. 1 which illustrates a block diagram of an aircraft identification system in accordance with the present invention. The system of FIG. 1 includes ground based electronic equipment 10 and airborne equipment 12. The ground based equipment 10 can, for example, be stationed at the control tower of an airport. Equipment 10 essentially consists of a transmitter 14 and a receiver 16. The transmitter 14 and receiver 16 are well known in the art and need merely be capable of transmitting and receiving radar frequency electromagnetic energy. The airborne equipment 12 essentially consists of a reflector antenna or radar echo enhancer 18 and a code modulator means 20 for varying the reflectivity characteristics of the antenna 18.

A preferred embodiment of the antenna 18 will be discussed in detail hereinafter. Briefly, however, the antenna or echo enhancer 18 has variable reflectivity characteristics enabling it to define a variable effective "cross-section". More particularly, it is well known that any electrically conductive body will define an effective cross-sectional area at a given radar frequency and will reflect a portion of the energy incident thereon which portion is proportional to the effective cross-sectional area defined. The antenna 18 includes a variable reflector means which can be controlled or modulated by the modulator 20 so as to reflect varying amounts of energy from the transmitter 14 back to the receiver 16. Thus, the code modulator 20 can modulate the reflectivity characteristics of the antenna 18 so as to impress a signature or identification code on the radar frequency energy reflected back to receiver 16. It will therefore be appreciated that the system of FIG. 1 is exceedingly useful for enabling ground stations such as airport control towers to keep track of light aircraft traffic in that each aircraft can continually identify itself with a unique code which is impressed on the radar frequency energy reflected therefrom. By utilizing otherwise conventional equipment, a radar operator will be able to positively identify each spot on his radarscope.

Figure 2:
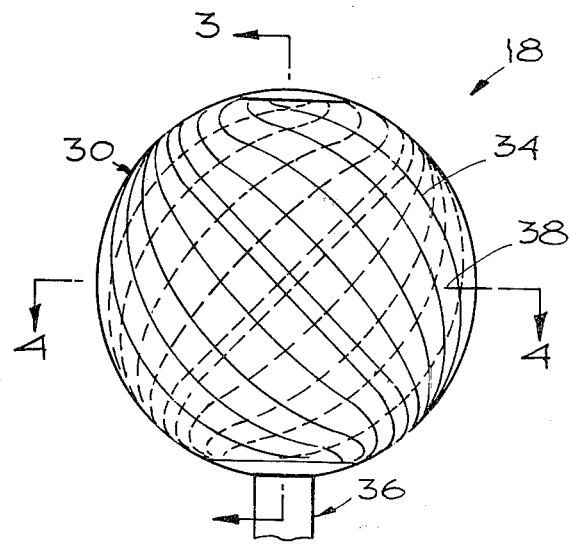
FIG. 2 is a plan view of a preferred embodiment of an antenna structure in accordance with the present invention.
Figure 3:
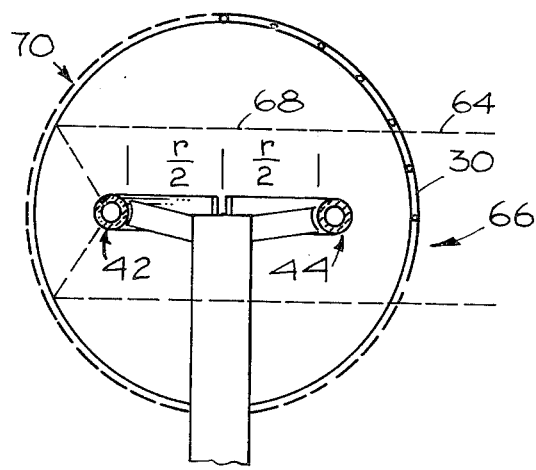
FIG. 3 is a vertical sectional view taken substantially along the plane 3—3 of FIG. 2.
Figure 4:
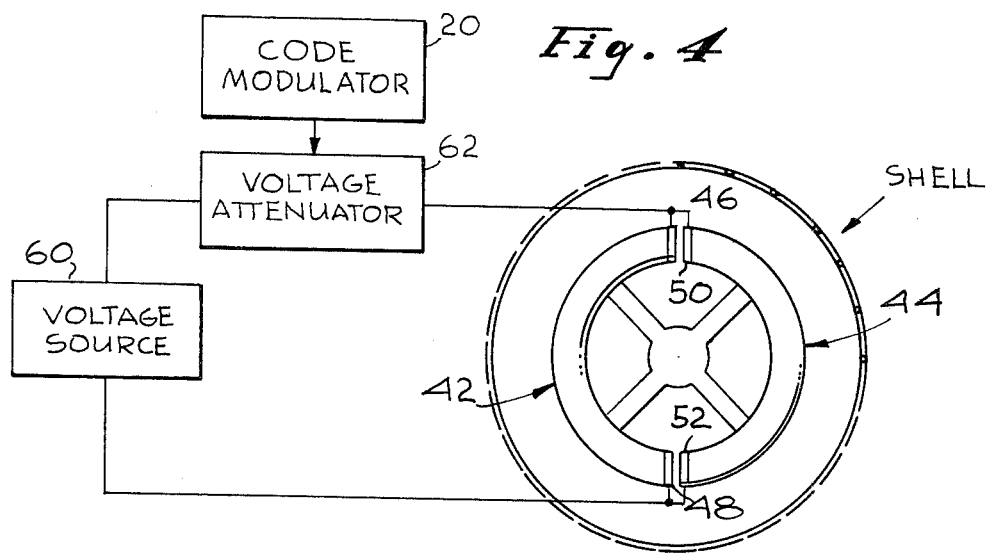
FIG. 4 is a horizontal sectional view taken substantially along the plane 4—4 of FIG. 2.

Attention is now called to FIGS. 2, 3 and 4 which illustrate the preferred embodiment of the reflector antenna 18. The antenna 18 of FIGS. 2-4 is comprised of a focussing means in the form of a hollow dielectric sphere 30 which supports a uniform mesh of parallel wires 34 at 45 degrees to the plane 4—4. The wires 34 can be supported by the dielectric sphere by either adhering the wires to the inner or outer sphere surface or embedding them within the sphere. The wires 34 extend substantially parallel to one another and are preferably oriented at 45 degrees to the horizontal. The antenna 18 is intended to be mounted on an aircraft, as by mounting means 36 with the center line 38 of the sphere oriented substantially horizontally. It will be noted in FIG. 2 that the wires 34 all pass through the center line 38 at an angle of substantially 45 degrees with respect thereto. Inasmuch as the wires 34 are all parallel to one another, it will be recognized that looking at the antenna 18 from any angle, the wires on the front surface can be considered as being inclined at an angle off +45 degrees to the horizontal while the wires on the rear surface can be considered as being inclined at an angle of −45 degrees. With this configuration, incoming vertically or azimuthally polarized plane waves will suffer a three decibel power loss at the front surface of the sphere. That is, the component of the incoming wave at +45 degrees will be scattered by the front surface wires oriented at +45 degrees, while the wave component at −45 degrees will pass through the front surface with virtually no loss. Thus, the wave entering the sphere will be polarized at −45 degrees to the horizontal. As previously noted, because of the spherical symmetry, the parallel wires at the rear surface will also appear to be at −45 degrees to the horizontal. If the wire spacing is equal to or less than 0.1 λ the wave will be substantially totally reflected off the rear surface and come to a focus at approximately ½ the radius of the sphere as is best shown in FIG. 3. Thus, it will be appreciated that the function of the dielectric sphere and mesh of parallel wires supported thereby is to collect radar frequency electromagnetic energy and focus it at a point within the sphere, which point, as noted, is at approximately ½ the radius of the sphere.

In accordance with the preferred embodiment of the invention, a variable radar frequency energy reflector is disposed in the locus of the ½ radius focal point (FIGS. 3, 4). It will of course be appreciated that the amount of radar frequency energy reflected from a body depends upon the electrical conductivity of that body. Accordingly, in accordance with the present invention, a tube 40 containing an ionizable gas is supported within the sphere 30. Ideally, the tube 40 should define a complete circle to thus exactly correspond to the locus of the ½ radius focal point. However, the fabrication of such a tube is extremely difficult, if not virtually impossible, and in lieu thereof, the tube 40 is preferably formed of two semicircular gas tubes 42 and 44 as shown in FIG. 4. The electrodes 46 and 48 of tube 42 can be placed extremely close to the electrodes 50 and 52 of tube 44 so as to minimize the discontinuity therebetween.

Each of the semicircular tubes 42 and 44 contains an ionizable gas and the number of ionized gas molecules therein determines the relative electrical conductivity of the gas and therefore its radar frequency reflectivity characteristics.

The gas tubes 42 and 44 may be conventional and in operation will require a high voltage pulse for starting with a lower voltage subsequently being required to maintain conduction. The level of that lower voltage of course determines the degree of ionization and thus the degree of conductivity and reflectivity of the tube. As shown in FIG. 4, a voltage source 60 is provided whose first terminal is connected to electrodes 48 and 52 of tubes 42 and 44. The other electrodes 46 and 50 of tubes 42 and 44 are returned through a voltage attenuator 62 to the other terminal of the voltage source 60. The code modulator means 20 previously discussed in conjunction with FIG. 1 controls the voltage attenuator 62 to thereby control the degree of ionization within the tubes 42 and 44.

As previously mentioned, a vertically polarized plane wave 64 incident on the front surface (66 in FIG. 3) of the sphere will be attenuated by substantially 3 db inasmuch as the component of the incoming wave +45 degrees will be scattered while the component at −45 degrees will pass through the front surface 66 without substantial loss. The wave 68 entering the sphere will therefore be polarized at −45 degrees and will be reflected off the rear surface wires (at −45 degrees) and come to focus at the gas tube 40 disposed at the locus of the ½ radius focal point. The energy incident on the gas tube 40 will be reflected therefrom against the rear surface wires which in turn will redirect the energy back to the energy source. When the gas tube 40 is not energized the energy reflected from the rear surface will pass through the tube and the antenna structure 18 will have an effective cross-sectional area $A_x$ at a given radar frequency such that the amount of energy reflected by the antenna 18 back to the receiver 16 will be proportional to $A_x$. Assuming that the gas tube when fully ionized defines an effective cross-sectional area $A_y$, then the energy reflected back to the receiver 16 will be proportional to $A_x + A_y$. Further, if the cross-sectional area of the reflector device, i.e., the gas tube in the preferred embodiment of the invention, can be made to vary between 0 and $A_y$, then the energy returned to the receiver 16 can likewise vary from an amount proportional to $A_x$ to an amount proportional to $A_x + A_y$. By varying the degree of enhancement ($A_y$) in accordance with some known coded format unique to a given target and defined by the modulator 20, that target can be discriminated and identified from others in its vicinity.

Figure 5:
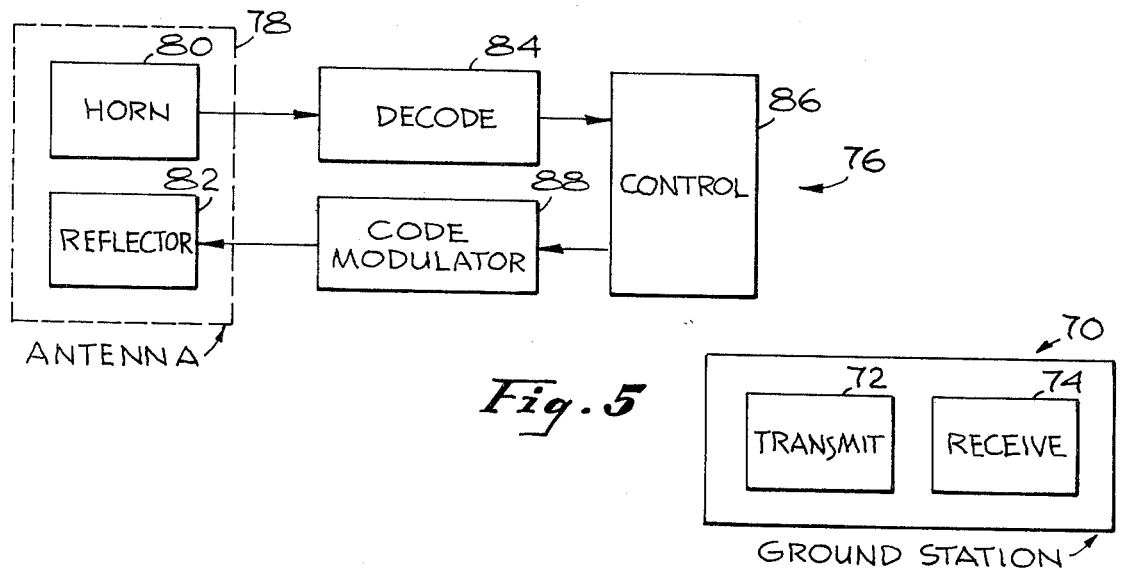
FIG. 5 is a block diagram illustrating an alternative communication system in accordance with the present invention.
Figure 6:
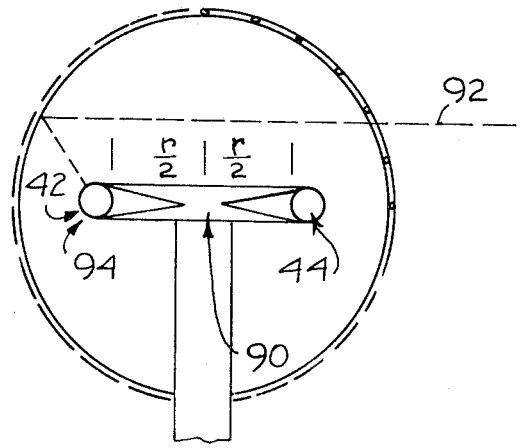
FIG. 6 is a schematic diagram illustrating an alternative antenna structure in accordance with the present invention.

In the preferred embodiment of the invention thus far described, it will be appreciated that the code modulator 20 will cyclically define an identifying code and correspondingly control the voltage attenuator 62. The code modulator 20 can comprise any of several different devices which may be either electronic or mechanical in nature. Regardless of the details of the code modulator 20 in FIG. 1, it has been assumed in the embodiment thus far described that the operation of the code modulator is independent of any signals or commands provided by the ground based equipment 10. It is however recognized that in certain applications of the invention, it may be desirable that the airborne equipment impress its identification code on the reflected energy only after an appropriate interrogation command has been received from the ground based equipment. A block diagram of a system of this type is illustrated in FIG. 5. More particularly, in the system of FIG. 5, the ground based equipment 70 again includes a transmitter 72 and a receiver 74. The airborne equipment 76 includes an antenna 78 including a receiving horn portion 80 and a variable reflector portion 82. The horn portion 80 is connected to a decoding means 84 which in turn is connected to a control means 86. The output of the control means 86 is connected to a code modulator 88 which in turn controls the variable reflector 82.

Thus, in the operation of the system of FIG. 5, the code modulator 88 will not normally function to control the reflector portion 82 of the antenna 78. Rather, in response to transmitted energy received from transmitter 72, the antenna 78 will reflect an amount of energy to receiver 74 which is related to its deactivated effective cross-sectional area $A_x$. However, during the period of inactivity, the horn portion 80 of the antenna 78 will pick up a portion of the energy provided by transmitter 72. When an appropriate interrogation signal is recognized by the decoder means 84, the control means 86 will thereafter activate the code modulator means 88 to then control the reflectivity characteristics of the reflector portion 82 of the antenna 78.

The antenna 78 of the embodiment of FIG. 5 can be substantially identical to the antenna 18 illustrated in detail in FIGS. 2-4. It will differ therefrom however in that a biconical horn 90 is supported at the center of the sphere. When the gas tube is not energized, a component of an electro-magnetic wave 92 incident on the sphere will pass through the de-energized and thus nonreflective gas tube 94 to the biconical horn 90. As previously pointed out, the energy picked up by the biconical horn 90 will be coupled to the control means 86 through a decoder means 84. When the appropriate interrogation command is recognized, the gas in the tube 94 will be ionized to thereafter reflect energy incident on the tube 94 by varying amounts dependent upon the degree of ionization.

From the foregoing, it will be appreciated that relatively simple, but extremely effective, systems have been disclosed herein for identifying targets such as light aircraft. It will be recognized that the disclosed systems can be extended to many other applications such as for example identifying ground based vehicles such as commercial or police vehicles. Regardless of the application, the embodiments of the invention utilize antenna or target structures which have a controllable variable reflectivity characteristic enabling information to be impressed on energy reflected therefrom.

I claim:

1. An antenna structure including:
   a focussing means including a plurality of substantially parallel electrical conductors each coincident with a common spherical surface,
   a reflector means having controllably variable reflectivity characteristics and being supported at the locus of substantially one-half the radius of said spherical surface, and
   means supporting said focussing means relative to said reflector means for directing energy-propagating along a first path and incident on said focussing means against said reflector means and for redirecting such energy reflected by said reflector means against said focussing means for redirection along said first path.

2. A system for communicating information between first and second spaced stations, said system including:
   electromagnetic energy transmitter means and receiver means located at said first station,
   focussing means located at said second station and including a plurality of substantially parallel electrical conductors each coincident with a common spherical surface,
   a retrodirective electromagnetic energy reflector means located at the locus of substantially one-half the radius of said spherical surface,
   said focussing means operating to focus energy propagating along a first path and incident thereon onto said reflector means and for redirecting energy reflected thereagainst from said reflector means along said first path, and
   means for controllably varying the electromagnetic energy reflectivity characteristics of said reflector means.

3. An antenna structure including:
   a focussing means including a spherical mesh of parallel electrical conductors for redirecting electromagnetic energy applied thereto,
   a reflector means symmetrically disposed within and spaced from said spherical mesh and including an ionizable gas tube having controllably variable electrical conductivity characteristics for receiving energy redirected by said focussing means and for reflecting energy back thereto,
   said focussing means being operable in cooperation with said reflector means so that energy received by the antenna structure propagated along an input path has a first redirection applied thereto by said focussing means for propagating the energy in a direction intercepting said reflector means which reflects a variable amount of energy back to said focussing means for a second redirection thereby for propagating the energy along an output path substantially parallel to but opposite from said input path.

4. The invention in accordance with claim 3, wherein said reflector means is substantially in the form of a concentric ring.

5. The invention in accordance with claim 4, wherein said concentric ring includes a tube containing an ionizable gas.

* * * * *